US008122373B2

(12) United States Patent
Nagano

(10) Patent No.: US 8,122,373 B2
(45) Date of Patent: Feb. 21, 2012

(54) IMAGE DISPLAY CONTROL APPARATUS AND PROGRAM AND METHOD THEREFOR

(75) Inventor: Sadakazu Nagano, Tokyo (JP)

(73) Assignee: Sony Corporation, Tokyo (JP)

( * ) Notice: Subject to any disclaimer, the term of this patent is extended or adjusted under 35 U.S.C. 154(b) by 1207 days.

(21) Appl. No.: 11/251,655

(22) Filed: Oct. 17, 2005

(65) Prior Publication Data

US 2006/0101389 A1 May 11, 2006

(30) Foreign Application Priority Data

Oct. 19, 2004 (JP) ................................ 2004-304434

(51) Int. Cl.
*G06F 3/048* (2006.01)

(52) U.S. Cl. ........................................ 715/804; 715/805

(58) Field of Classification Search ........... 715/200–867
See application file for complete search history.

(56) References Cited

U.S. PATENT DOCUMENTS

| | | | | |
|---|---|---|---|---|
| 5,668,997 | A | 9/1997 | Lynch-Freshner et al. | |
| 5,877,762 | A * | 3/1999 | Young | 715/803 |
| 5,995,103 | A * | 11/1999 | Ashe | 715/804 |
| 6,462,757 | B1 | 10/2002 | Kao et al. | |
| 6,493,005 | B1 | 12/2002 | Wu | |
| 2002/0149626 | A1 | 10/2002 | Ozcelik et al. | |

FOREIGN PATENT DOCUMENTS

| | | |
|---|---|---|
| JP | 2 234219 | 9/1990 |
| JP | 4 256125 | 9/1992 |
| JP | 5 35881 | 2/1993 |
| JP | 7 219740 | 8/1995 |
| JP | 7-287646 | 10/1995 |
| JP | 11 15626 | 1/1999 |
| JP | 2002 163057 | 6/2002 |
| WO | WO 97 05743 | 2/1997 |
| WO | WO 97/05743 | 2/1997 |

OTHER PUBLICATIONS

Kim C; Westin S A: "Data Structures" Jan. 1, 1999, Encyclopedia of Computer Science and Technology XP009088058 ISBN: 978-0-8247-2270-8.
European Office Action dated Jul. 29, 2009.
EPO Office Action dated Jan. 11, 2010.

* cited by examiner

*Primary Examiner* — Omar Abdul-Ali
(74) *Attorney, Agent, or Firm* — Frommer Lawrence & Haug LLP; William S. Frommer; Ellen Marcie Emas

(57) ABSTRACT

An image display control apparatus, an image display control method for the image display control apparatus, and a program for the image display control apparatus that control display of windows on a screen on the basis of window headers, the program including the steps of: creating the window headers, in which coordinates on the screen of the windows are described, on a memory; sorting y coordinates in coordinates of the windows described in the window headers; linking the window headers in an order of the y coordinates sorted; and setting a position on the memory of the window header at the top of the link.

7 Claims, 14 Drawing Sheets

IMAGE DISPLAY CONTROL APPARATUS AND PROGRAM AND METHOD THEREFOR

CROSS-REFERENCES TO RELATED APPLICATIONS

This application contains subject matter related to Japanese Patent Application JP2004-304434 filed in the Japanese Patent Office on Oct. 19, 2004, the entire contents of which being incorporated herein by reference.

BACKGROUND OF THE INVENTION

1. Field of the Invention

The present invention relates to an image display control apparatus, an image display control method for the image display control apparatus, and a program for the image display control apparatus, and, in particular to an image display control apparatus, an image display control method for the image display control apparatus, and a program for the image display control apparatus that make it possible to display windows easily and surely.

2. Description of the Related Art

Recently, in an electronic apparatus, various kinds of information forming a Graphical User Interface (GUI) are displayed on a screen to cause a user to select and operate the GUI to perform various kinds of input.

In this case, it is necessary to display plural windows including buttons, photographs, and other information on the screen. When the plural windows are displayed, display states of the windows at each display time are described as window layout information in advance (e.g., JP-A-7-287646). In this case, for example, an application program describes coordinates on the screen, where the windows are displayed, in window headers. The windows are displayed in positions described in the window headers.

SUMMARY OF THE INVENTION

In the past, in order to make it possible to display windows promptly on the basis of window headers, a window header string including plural window headers corresponding to the respective windows is sorted on the basis of y coordinates of the windows to form the window headers in an order of the y coordinates. As a result, when display positions of the windows are changed or when new windows are added, the entire window header string has to be changed. Thus, it is difficult to add windows and change positions of windows promptly and easily.

Moreover, since application programs generate window header strings, respectively, it takes time and cost to produce the application programs.

The invention has been devised in view of the circumstances. It is desirable to make it possible to display plural windows easily and surely.

It is also desirable to make it possible to provide application programs at low cost.

A program according to an embodiment of the invention is a program for an image display control apparatus that controls display of windows on a screen on the basis of window headers. The program includes the steps of: creating the window headers, in which coordinates on the screen of the windows are described, on a memory; sorting y coordinates in coordinates of the windows described in the window headers; linking the window headers in an order of the y coordinates sorted; and setting a position on the memory of the window header at the top of the link.

The program is middleware. In the creating step, it is possible to create the window headers when an application program requests display of the windows.

In the setting step, it is possible to set the position on the memory of the window header at the top of the link in a register.

In the linking step, it is possible to further describe flags representing presence or absence of link destinations in the window headers.

The program may further include the step of, in erasing the windows, excluding the window headers of the windows from the link.

The program may further include the step of, in moving the windows, correcting the coordinates of the windows. In the sorting step, the linking step, and the setting step, it is possible to execute processing in the respective steps again on the basis of the coordinates corrected.

An image display control method according to another embodiment of the invention is an image display control method for an image display control apparatus that controls display of windows on a screen on the basis of window headers. The image display control method includes the steps of: creating the window headers, in which coordinates on the screen of the windows are described, on a memory; sorting y coordinates in coordinates of the windows described in the window headers; linking the window headers in an order of the y coordinates sorted; and setting a position on the memory of the window header at the top of the link.

An image display control apparatus according to still another embodiment of the invention is an image display control apparatus that controls display of windows on a screen on the basis of window headers. The image display control apparatus includes: a window header creating section creating the window headers, in which coordinates on the screen of the windows are described, on a memory; a sorting section sorting y coordinates in coordinates of the windows described in the window headers; a linking section linking the window headers in an order of the y coordinates sorted; and a setting section setting a position on the memory of the window header at the top of the link.

According to the embodiments of the invention, the window headers are created on the memory, the y coordinates in the coordinates of the windows described in the window headers are sorted, and the window headers are linked in an order of the y coordinates sorted.

According to the embodiments of the invention, it is possible to display plural windows in predetermined positions easily and surely. It is also possible to provide application programs at low cost.

DESCRIPTION OF THE PREFERRED EMBODIMENTS

Exemplary embodiments of the present invention will be hereinafter explained. Note that, even if there is an embodiment that is described in the specification but is not described in this section as one corresponding to the invention, this does not means that the embodiment does not correspond to the invention. Conversely, even if an embodiment is described in this section as one corresponding to the invention, this does not means that the embodiment does not correspond to inventions other than the invention.

Moreover, this description does not mean all inventions described in the specification. In other words, the description does not deny presence of inventions described in the specification and not claimed in this application, that is, presence of inventions that will be applied for a patent through divisional application or appear through amendment to be added.

A program according to an embodiment of the invention is a program for an image display control apparatus (e.g., an image display control apparatus 1 in FIG. 1) that controls display of windows on a screen on the basis of window headers. The program includes: a window header creating step (e.g., step S81 in FIG. 9) of creating the window headers (e.g., window headers in FIG. 12), in which coordinates on the screen (e.g., on a screen 201 in FIG. 11) of the windows (e.g., windows 1 to 3 in FIG. 11) are described, on a memory (e.g., on a RAM 12 in FIG. 1); a sorting step (e.g., step S83 in FIG. 9) of sorting y coordinates in coordinates of the windows described in the window headers; a linking step (e.g., step S84 in FIG. 9) of linking the window headers in an order of the y coordinates sorted (e.g., FIG. 12); and a setting step (e.g., step S85 in FIG. 9) of setting a position on the memory of the window header at the top of the link.

Figure 1:
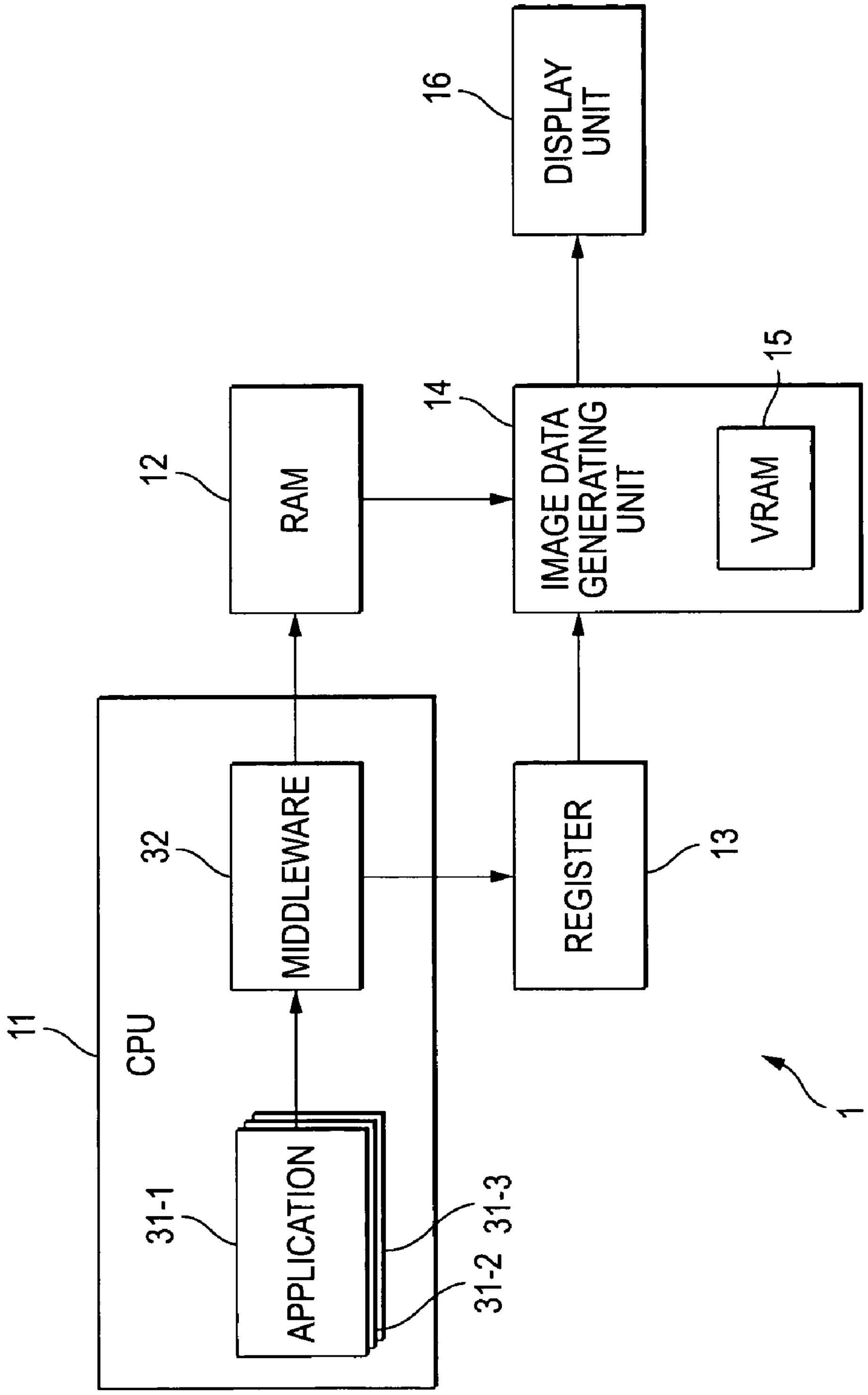
FIG. 1 is a block diagram showing an example of a constitution of an image display control apparatus to which an embodiment of the invention is applied.

The program is middleware (e.g., middleware 32 in FIG. 1). In the creating step, the window headers are created when an application program (e.g., an application 31 in FIG. 1) requests display of the windows.

In the setting step, the position on the memory of the window header at the top of the link is set in a register (e.g., a register 13 in FIG. 1).

Figure 10:
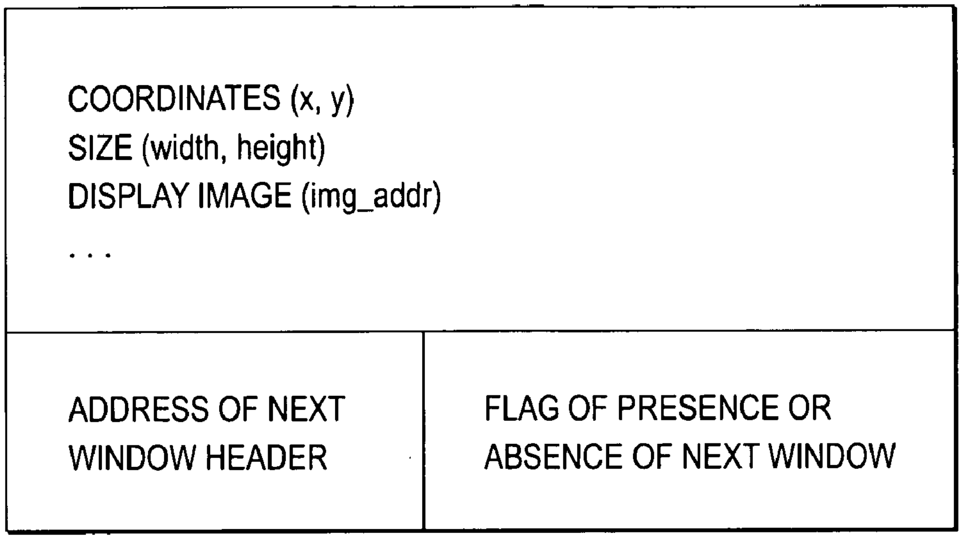
FIG. 10 is a diagram showing an example of a structure of a window header.

In the linking step, flags (e.g., a flag indicating presence or absence of the next window in FIG. 10) representing presence or absence of link destinations are described in the window headers.

The program further includes an excluding step (e.g., step S57 in FIG. 8) of, in erasing the windows, excluding the window headers of the windows from the link.

The program further includes a correcting step (e.g., step S101 in FIG. 13) of, in moving the windows, correcting the coordinates of the windows. In the sorting step (e.g., step S105 in FIG. 13), the linking step (e.g., step S106 in FIG. 13), and the setting step (e.g., step S107 in FIG. 13), processing in the respective steps is executed again on the basis of the coordinates corrected.

An image display control method according to another embodiment of the invention is an image display control method for an image display control apparatus (e.g., an image display control apparatus 1 in FIG. 1) that controls display of windows on a screen on the basis of window headers. The image display control method includes: a window header creating step (e.g., step S81 in FIG. 9) of creating the window headers (e.g., window headers in FIG. 12), in which coordinates on the screen (e.g., on a screen 201 in FIG. 11) of the windows (e.g., windows 1 to 3 in FIG. 11) are described, on a memory (e.g., on a RAM 12 in FIG. 1); a sorting step (e.g., step S83 in FIG. 9) of sorting y coordinates in coordinates of the windows described in the window headers; a linking step (e.g., step S84 in FIG. 9) of linking the window headers in an order of they coordinates sorted (e.g., FIG. 12); and a setting step (e.g., step S85 in FIG. 9) of setting a position on the memory of the window header at the top of the link.

An image display control apparatus according to still another embodiment of the invention is an image display control apparatus (e.g., an image display control apparatus 1 in FIG. 1) that controls display of windows on a screen on the basis of window headers. The image display control apparatus includes: a window header creating section (e.g., a creating section 91 in FIG. 4 that executes processing in step S81 in FIG. 9) creating the window headers (e.g., window headers in FIG. 12), in which coordinates on the screen (e.g., on a screen 201 in FIG. 11) of the windows (e.g., windows 1 to 3 in FIG. 11) are described, on a memory (e.g., a RAM 12 in FIG. 1); a sorting section (a sorting section 93 in FIG. 4 that executes processing in step S83 in FIG. 9) sorting y coordinates in coordinates of the windows described in the window headers; a linking section (e.g., a linking section 94 in FIG. 4 that executes processing in step S84 in FIG. 9) linking the window headers in an order of the y coordinates sorted (e.g., FIG. 12); and a setting section (e.g., a setting section 95 in FIG. 4 that executes processing in step S85 in FIG. 9) setting a position on the memory of the window header at the top of the link.

An embodiment of the invention will be hereinafter explained with reference to the accompanying drawings. FIG. 1 is a block diagram showing an example of a constitution of an image display control apparatus to which an embodiment of the invention is applied. An image display control apparatus 1 is constituted by, for example, a hard disk recorder or a Digital Versatile Disk (DVD) recorder.

The image display control apparatus 1 includes a Central Processing Unit (CPU) 11, a Random Access Memory (RAM) 12, a register 13, an image data generating unit 14 having a Video RAM (VRAM) 15, and a display unit 16.

The CPU 11 executes loaded application programs (hereinafter simply referred to as applications) 31-1 to 31-3 and middleware 32.

An arbitrary number of (three in the case of this embodiment) applications 31-1 to 31-3 request the middleware 32 to display windows in order to display images necessary for the applications 31-1 to 31-3, respectively. The middleware 32 executes predetermined processing to display the windows on the basis of the requests from the respective applications 31-1 to 31-3 (hereinafter simply referred to as application 31 unless it is necessary to distinguish the applications from one another).

The middleware 32 creates a window header string in the RAM 12. The middleware 32 causes the register 13 to store (set) an address on the RAM 12 of a window header at the top of a link in the window header string. The image data generating unit 14 generates, on the basis of the window header string stored in the RAM 12, image data of windows described in the window header string and renders the image data on the VRAM 15. The image data on the VRAM 15 is read out and outputted to the display unit 16 to be displayed.

Figure 2:
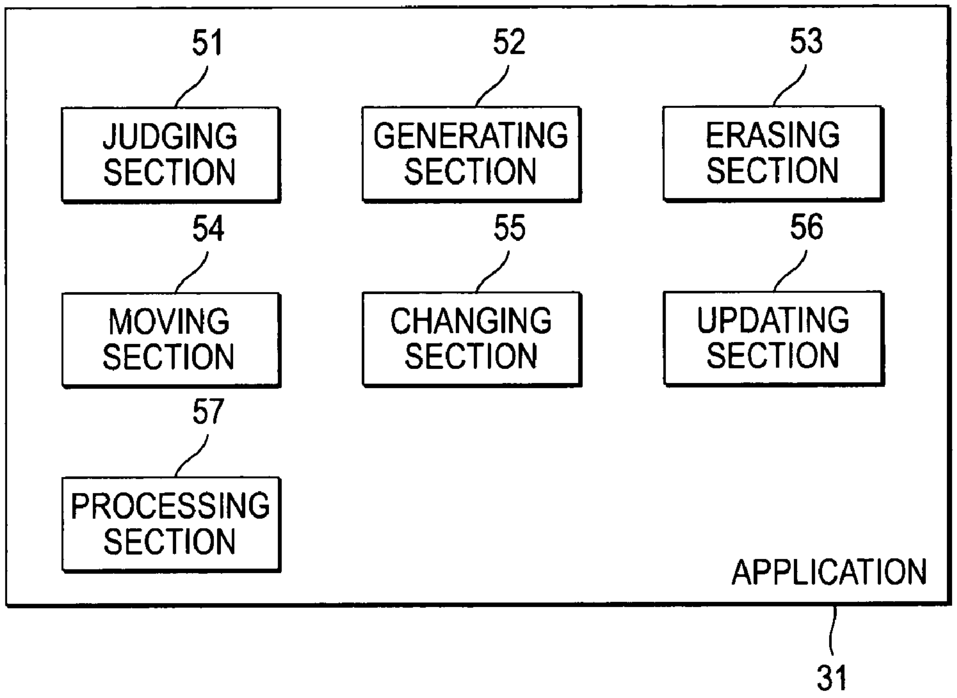
FIG. 2 is a block diagram showing an example of a functional constitution of an application.

The application 31 has, for example, a functional constitution shown in FIG. 2. The application 31 includes a judging section 51, a generating section 52, an erasing section 53, a moving section 54, a changing section 55, an updating section 56, and a processing section 57. The judging section 51 performs various kinds of judgment processing. The generating section 52 performs processing necessary for generation of windows. Specifically, the generating section 52 generates and outputs coordinates, sizes, and addresses on the RAM 12, in which display images are stored, and the like of windows. The erasing section 53 generates and outputs, in erasing a window, coordinates of the window to be erased. The moving section 54 outputs coordinates of a window at a moving destination. The changing section 55 outputs, in changing a size of a window, coordinates and a size of the window. The updating section 56 updates, in updating a state of a window, coordinates and state parameters of the window. The processing section 57 executes other processing.

Figure 3:
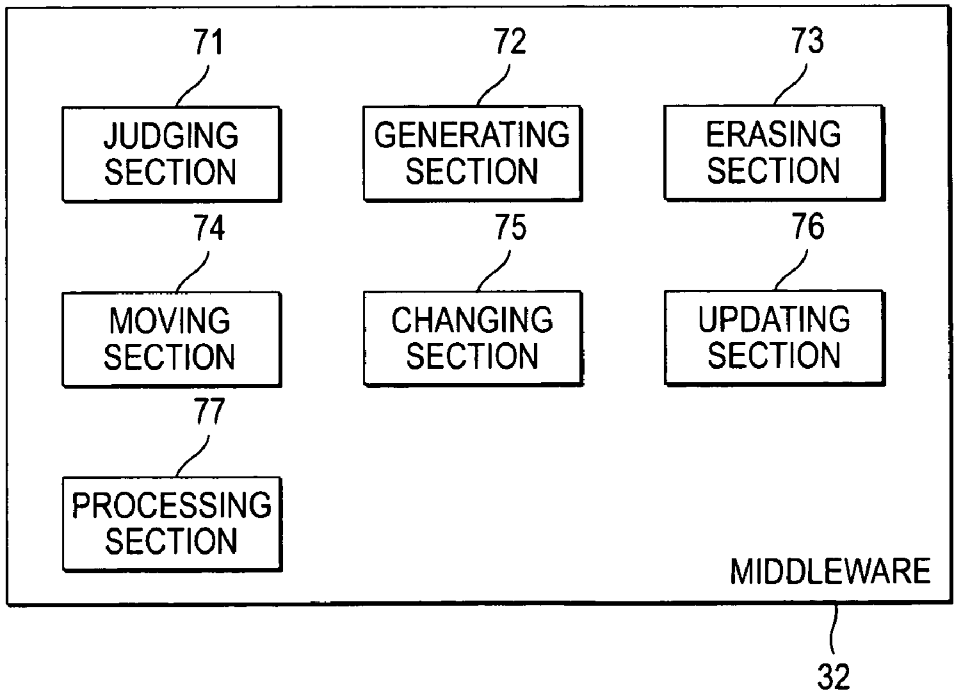
FIG. 3 is a block diagram showing an example of a functional constitution of middleware.

FIG. 3 is a block diagram showing an example of a functional constitution of the middleware 32. A judging section 71 performs various kinds of judgment processing. A generating section 72 performs processing for generating a window. An erasing section 73 performs processing for erasing a window. A moving section 74 performs processing for moving a window. A changing section 75 performs processing for changing a size of a window. An updating section 76 performs processing for changing, in updating a state of a window, state parameters of a designated window. A processing section 77 performs other processing.

Figure 4:
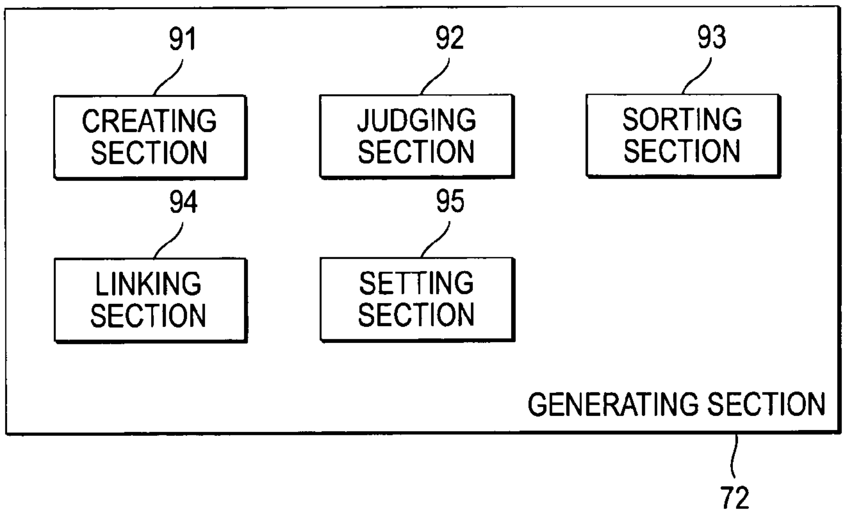
FIG. 4 is a block diagram showing an example of a functional constitution of a generating section in FIG. 3.

As shown in FIG. 4, the generating section 72 of the middleware 32 includes a functional constitution including a creating section 91, a judging section 92, a sorting section 93, a linking section 94, and a setting section 95.

The creating section 91 creates window headers. The judging section 92 judges whether window headers are created. The sorting section 93 sorts y coordinates of the window headers. The linking section 94 performs processing for linking the window headers in an order of the y coordinates. The setting section 95 performs processing for setting an address on the RAM 12 of a window header, in which a window with smallest y coordinates is described, in the register 13 as an address of a top window.

Figure 5:
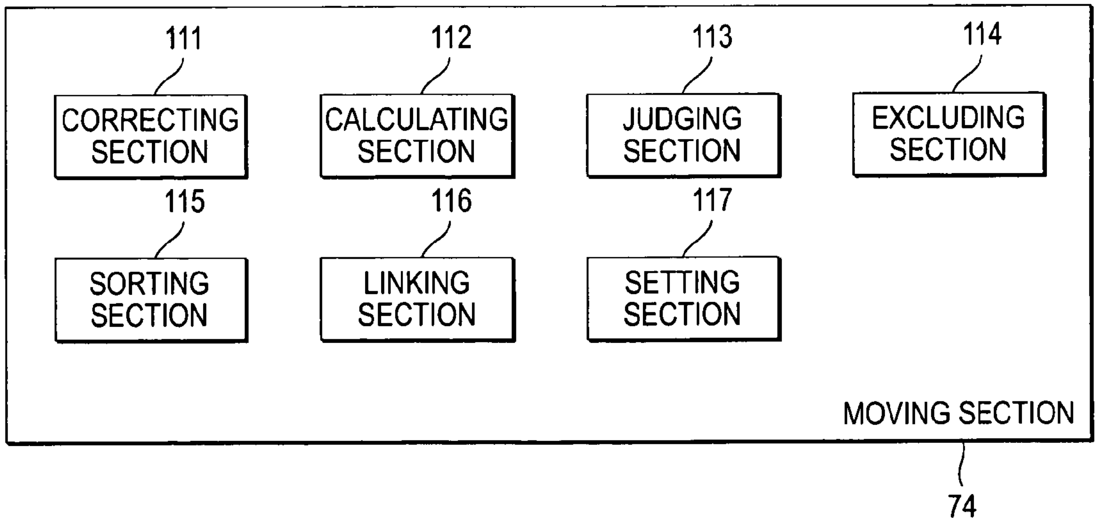
FIG. 5 is a block diagram showing an example of a functional constitution of a moving section in FIG. 3.

As shown in FIG. 5, the moving section 74 of the middleware 32 includes a correcting section 111, a calculating section 112, a judging section 113, an excluding section 114, a sorting section 115, a linking section 116, and a setting section 117.

The correcting section 111 performs processing for correcting coordinates of window headers. The calculating section 112 calculates positions on a screen of windows after movement from coordinates and sizes of the windows after movement. The judging section 113 judges whether the windows are located in the screen. The excluding section 114 performs processing for excluding a window header from link objects. The sorting section 115 sorts y coordinates stored in the window headers. The linking section 116 performs processing for linking the window headers in an order of stored y coordinates. The setting section 117 performs processing for setting an address on the RAM 12 of a window with smallest y coordinates (at the top of the link) in the register 13 as a pointer of the top window.

Note that, for convenience of explanation, the sorting section 115, the linking section 116, and the setting section 117 in FIG. 5 are described as sections different from the sorting section 93, the linking section 94, and the setting section 95 in FIG. 4. However, the sorting section 115, the linking section 116, and the setting section 117 may be sections identical with the sorting section 93, the linking section 94, and the setting section 95.

Figure 6:
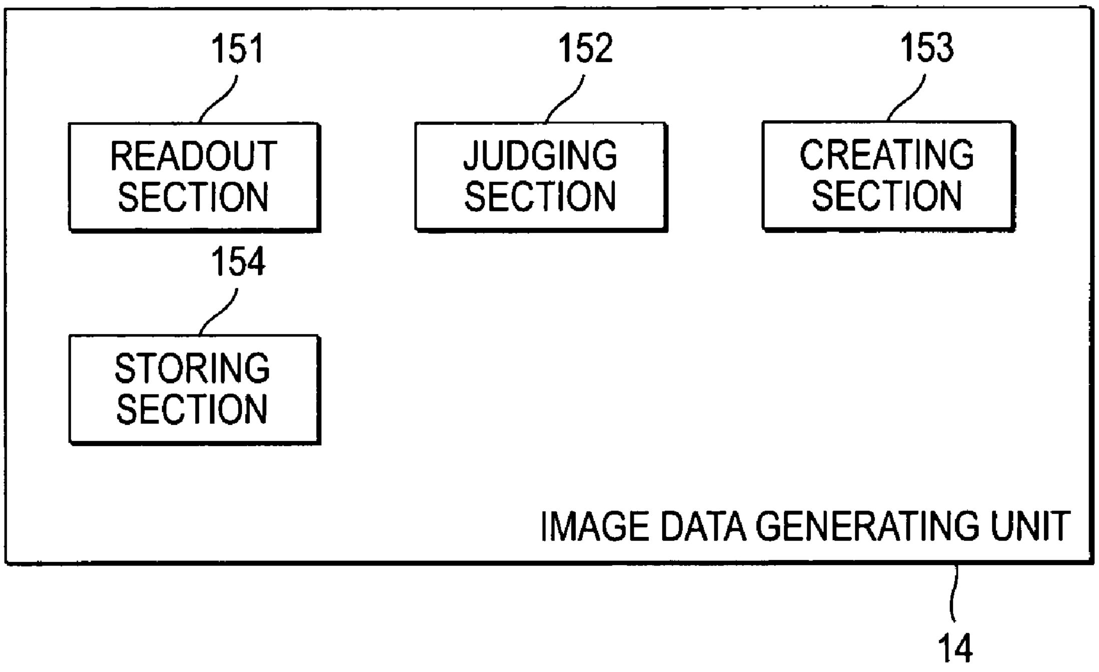
FIG. 6 is a block diagram showing an example of a functional constitution of an image data generating unit in FIG. 1.

The image data generating unit 14 is constituted as shown in FIG. 6. In this embodiment, the image data generating unit 14 includes a readout section 151, a judging section 152, a creating section 153, and a storing section 154 corresponding to the VRAM 15.

The readout section 151 reads out the pointer of the top window from the register 13. In addition, the readout section 151 performs processing for reading window header information. The judging section 152 judges presence or absence of a pointer, presence or absence of the next link destination, and the like. The creating section 153 creates windows. The storing section 154 stores image data of an image to be displayed on the display unit 16.

Operations of the image display control apparatus 1 in FIG. 1 will be explained. The application 31 executes processing of an application described in FIG. 7. The middleware 32 executes processing of middleware described in FIG. 8 on the basis of a request from the application 31. The middleware 32 creates window headers and causes the RAM 12 to store the window headers. In addition, the middleware 32 causes the register 13 to store an address on the RAM 12 of a window header at the top of a link. The image data generating unit 14 specifies a position of the top window header on the RAM 12 on the basis of the pointer stored in the register 13 and follows the link to access the respective window headers. The image data generating unit 14 executes image generation processing described in a flowchart in FIG. 18 on the basis of the storage of the window headers and causes the display unit 16 to display an arbitrary number of windows.

Processing of the respective sections will be explained.

Figure 7:
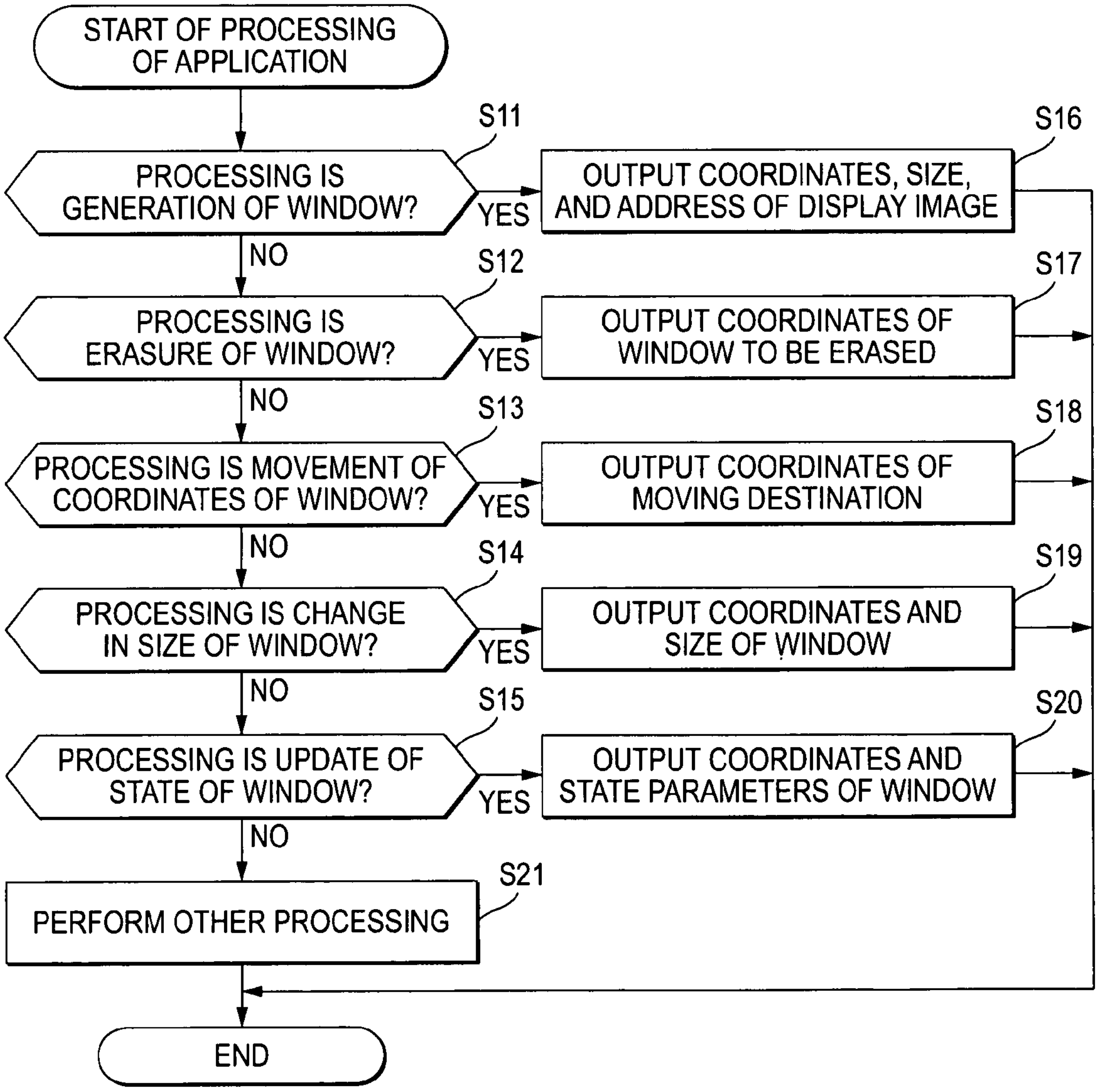
FIG. 7 is a flowchart for explaining processing of the application.

First, processing of the application 31 will be explained with reference to a flowchart in FIG. 7.

In step S11, the judging section 51 judges whether processing that should be performed is generation of a window. When the processing is generation of a window, in step S16, the generating section 52 outputs coordinates, a size, and an address of a display image of the window to be generated to the middleware 32. The middleware 32 describes the coordinates, the size, and the address of the display image in a window header in step S81 in FIG. 9 described later.

When it is judged in step S11 that the processing is not generation of a window, in step S12, the judging section 51 judges whether the processing is erasure of a window. When the processing is erasure of a window, in step S17, the erasing section 53 outputs coordinates of the window to be erased to the middleware 32. In step S57 in FIG. 8 described later, the middleware 32 executes processing for excluding a designated window from a link of window headers.

When it is judged in step S12 that the processing is not erasure of a window, in step S13, the judging section 51 judges whether the processing is movement of coordinates of a window. When the processing is movement of coordinates of a window, in step S18, the moving section 54 outputs coordinates of a moving destination of the window to be moved to the middleware 32. In step S58 in FIG. 8, the middleware 32 executes movement processing on the basis of the coordinates.

When it is judged in step S13 that the processing is not movement of coordinates of a window, in step S17, the judging section 51 judges whether the processing is a change in a size of a window. When the processing is a change in a size of a window, in step S19, the changing section 55 outputs coordinates and a size of the window to be changed to the middleware 32. In step S59 in FIG. 8, the middleware 32 changes a size of the window described in the window header on the basis of the output.

When it is judged in step S14 that the processing is not a change in a size of a window, in step S15, the judging section 51 judges whether the processing is update of a state of a window. When the processing is update of a state of a window, in step S20, the updating section 56 executes processing for outputting coordinates and state parameters of the window to the middleware 32. In step S60 in FIG. 8, the middleware 32 executes processing for changing state parameters of a designated window on the basis of the output.

When it is judged in step S15 that the processing is not update of a state of a window, in step S21, the processing section 57 executes other processing.

Figure 8:
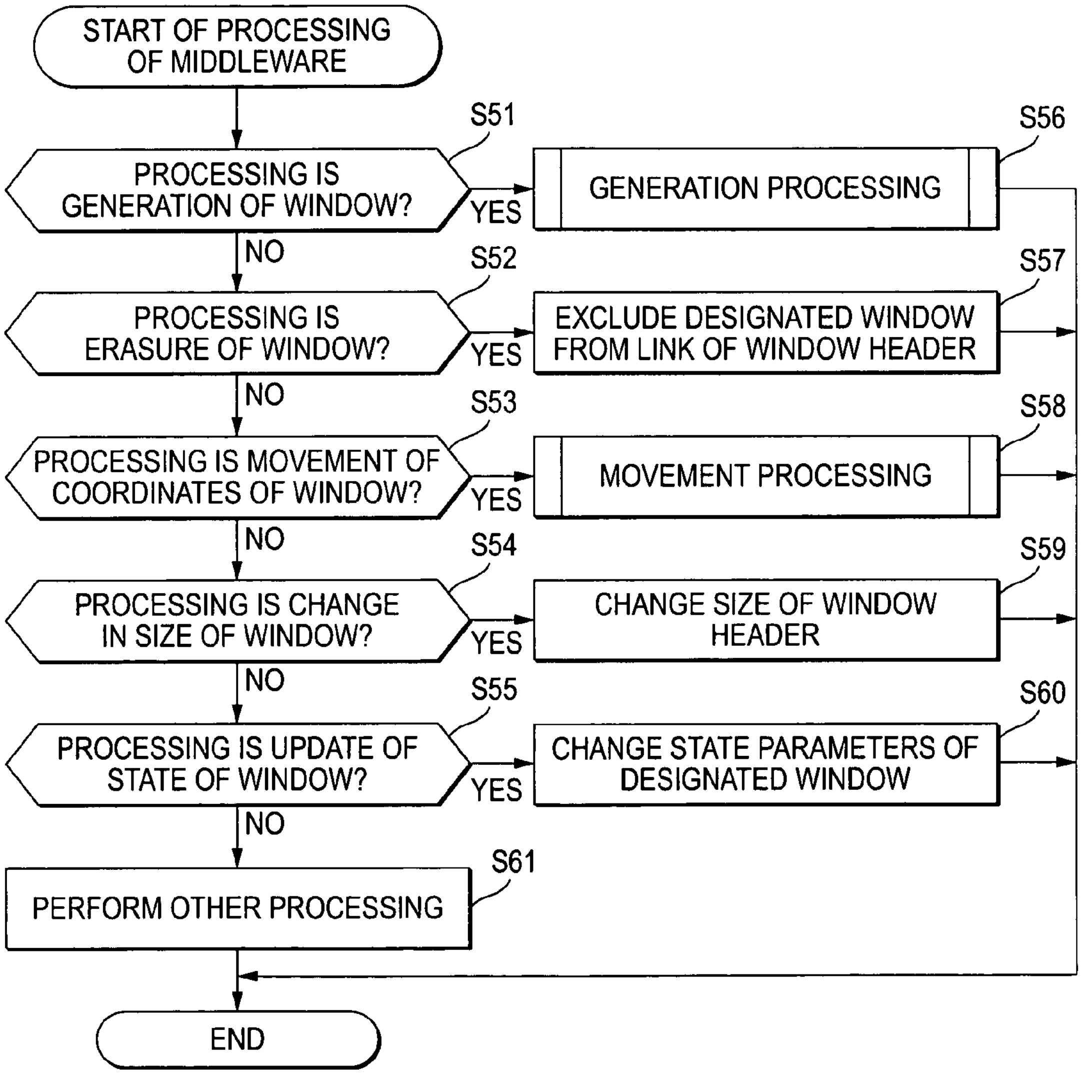
FIG. 8 is a flowchart for explaining processing of the middleware.

Processing of the middleware 32 will be explained with reference to a flowchart in FIG. 8. The processing is executed when the application 31 requests the middleware 32 to perform the processing. In step S51, the judging section 71 judges whether processing requested by the application 31 is generation of a window. When the processing requested by the application 31 is generation of a window, in step S56, the generating section 72 executes generation processing.

Figure 9:
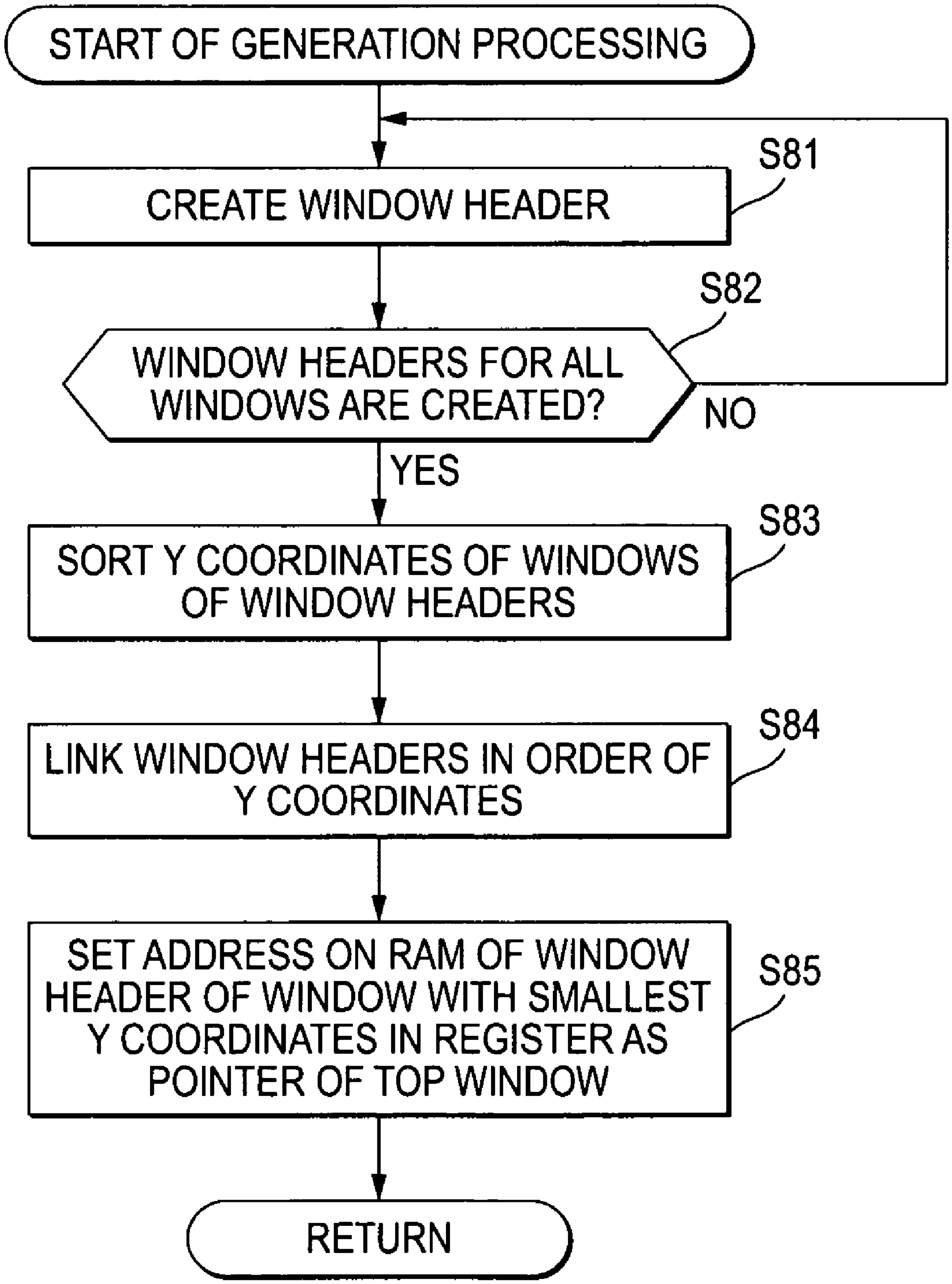
FIG. 9 is a flowchart for explaining details of generation processing in step S56 in FIG. 8.

Details of the generation processing are described in a flowchart in FIG. 9. In step S81, the creating section 91 creates a window header and causes the RAM 12 to store the window header. In step S82, the judging section 92 judges whether window headers for all windows are created. When window headers for all windows are not created, the processing is returned to step S81. The processing in step S81 and the subsequent steps is executed repeated.

FIG. 10 is a diagram showing an example of a structure of a window header created as described above. In this example, coordinates (x, y), a size (width, height), a display image (img_addr), and the like of a window are described in the window header. The coordinates of the window represent coordinates at an upper left part on a screen of the window. The size represents a width and a height of the window. The display image (img_addr) represents an address on the RAM 12 where an image to be displayed in the window is stored.

An address of the next window header is also described in the window header as a link destination. The address is an address on the RAM 12 where the window header is described. A flag indicating presence or absence of the next window is also described in the window header. The flag also indicates presence or absence of a window header at a link destination. When a link destination is present, the flag is set as, for example, "1" and, when a link destination is not present, the flag is set as "0".

Figure 11:
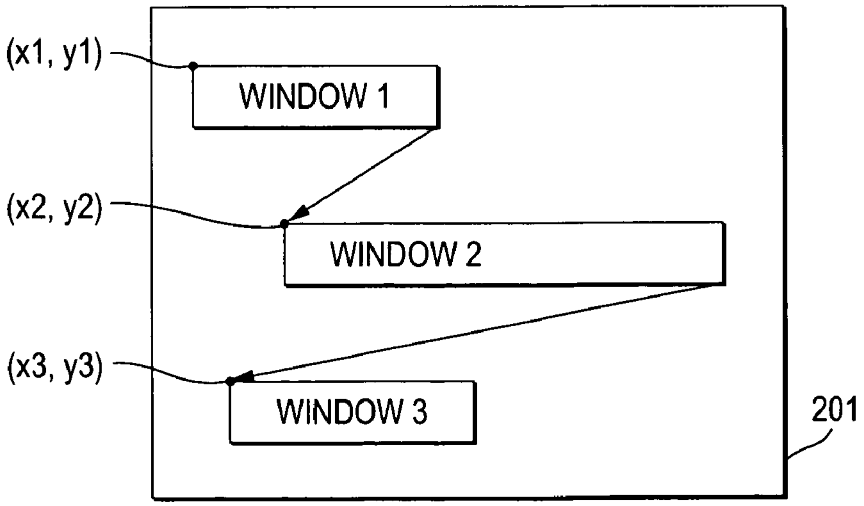
FIG. 11 is a diagram showing an example of display of windows.
Figure 12:
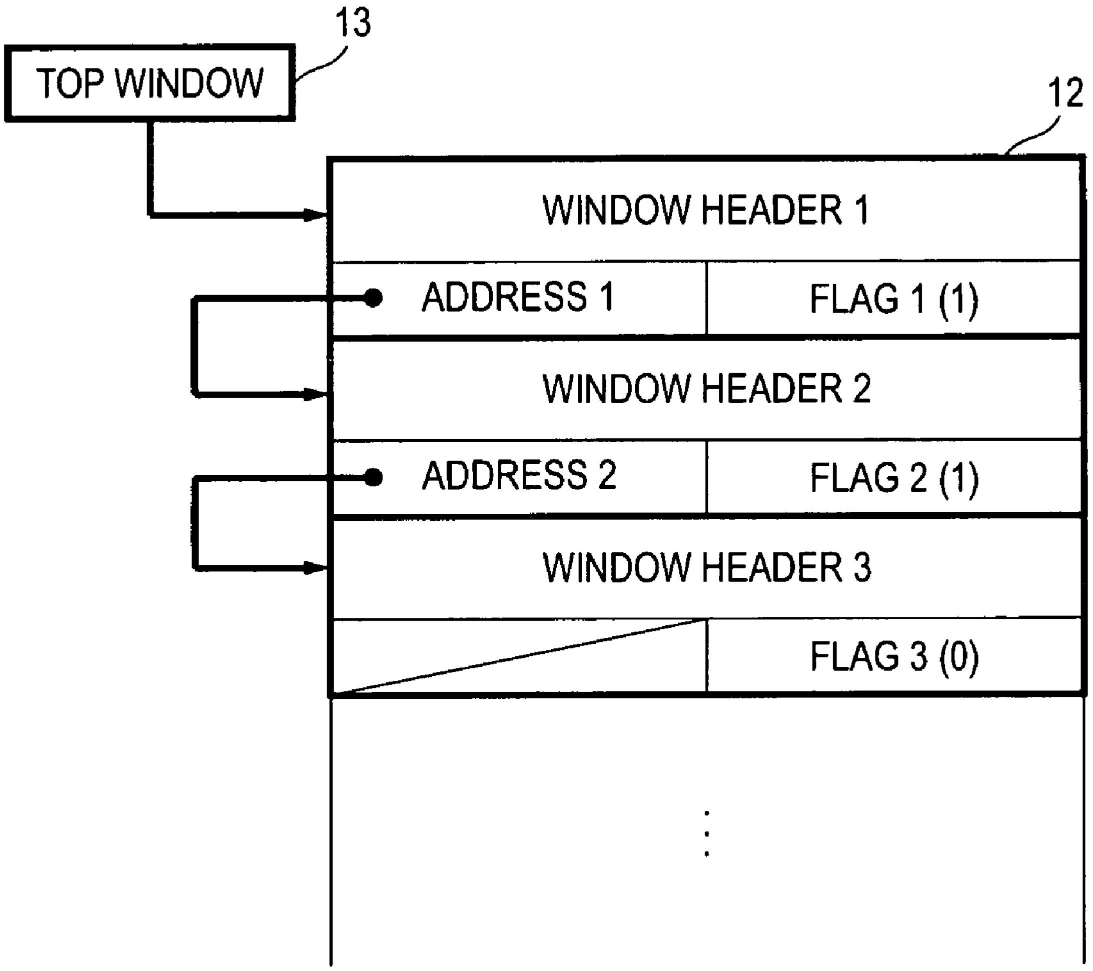
FIG. 12 is a diagram showing an example of a window header string.

For example, when three windows, namely, a window 1, a window 2, and a window 3 are displayed on a screen 201 as shown in FIG. 11, a window header string is described on the RAM 12 as shown in FIG. 12. In the case of this example, the window header string includes three window headers, namely, a window header 1 corresponding to the window 1, a window header 2 corresponding to the window 2, and a window header 3 corresponding to the window 3. An address 1 of the window header 1 represents an address on the RAM 12 of the next window header 2. An address 2 of the window header 2 represents an address on the RAM 12 of the next window header 3.

When it is judged in step S82 that window headers of all windows are created, in step S83, the sorting section 93 sorts y coordinates of the windows of the window headers. For example, as shown in FIG. 11, when coordinates of the window 1 is $(x_1, y_1)$, coordinates of the window 2 is $(x_2, y_2)$, and coordinates of the window 3 is $(X_3, y_3)$, y coordinates $y_1$, $y_2$, and $y_3$ of the windows 1 to 3 are sorted. Note that the y coordinates $y_1$, $y_2$, and $y_3$ are coordinates on the VRAM 15 (coordinates on the screen 201).

In the case of the example shown in FIG. 11, the y coordinates sorted are set in an order of $y_1$, $y_2$, and $y_3$. In step S84, the linking section 94 links the window headers in the order of the y coordinates. In step S85, the setting section 95 sets an address on the RAM 12 of a window header of a window with smallest y coordinates in the register 1 as a pointer of a top window.

In the case of the example shown in FIG. 11, the y coordinate of the window 1 is the smallest, the y coordinate of the window 2 is the second smallest, and the y coordinate of the window 3 is the largest. Thus, the windows are linked in an order of the window 1, the window 2, and the window 3. Therefore, as shown in FIG. 12, an address on the RAM 12 of the window header 2 is described as the address 1 of a window header next to the window header 1. An address on the RAM 12 of the window header 3 is described as the address 2 of a window header next to the window header 2.

Another window header is not linked following the window header 3. Therefore, nothing is described in an address (an address 3) of a window header next to the window header 3.

When the next window is present, the flag is set as "1" and, when the next window is not present, the flag is set as "0". Thus, as shown in FIG. 12, "1" is described in a flag 1 of the window header 1, "1" is described in a flag 2 of the window header 2, and "0" is described in a flag 3 of the window header 3.

A window header corresponding to the window at the top of the link is the window header 1. Thus, an address on the RAM 12 of the window header 1 is described in the register 13 as an address (a pointer) of the window header of the top window.

The flag indicating presence or absence of the next window may be omitted by causing the address of the next window header to also indicate presence or absence of the next window.

Referring back to FIG. 8, when it is judged in step S51 that the request for processing from the application 31 is not generation of a window, in step S52, the judging section 71 judges whether the processing is erasure of a window. When the processing is erasure of a window, in step S57, the erasing section 73 executes processing for excluding a designated window from a link of window headers. For example, in the example shown in FIG. 12, when erasure of the window 3 is designated, a link of the window header 3 is excluded from the window header string. Specifically, an address in the address 2 of the window header 2 is erased. The flag 2 of the window header 2 is changed from "1" to "0".

As described later, the image data generating unit 14 displays windows on the basis of a description of the window header string. Thus, when the window header 3 is excluded from the link, the window 3 corresponding to the window header 3 is not displayed. In other words, the window 3 is erased.

In this way, processing for erasing the window 3 is performed by excluding the window header 3 from the link rather than erasing the window header 3 itself. Consequently, when the window 3 is created again, the link only has to be connected to the window 3. Thus, prompt processing is possible.

In step S53, the judging section 71 judges whether the processing is movement of coordinates of a window. When the processing is movement of coordinates of a window, in step S58, the moving section 74 executes movement processing.

Figure 13:
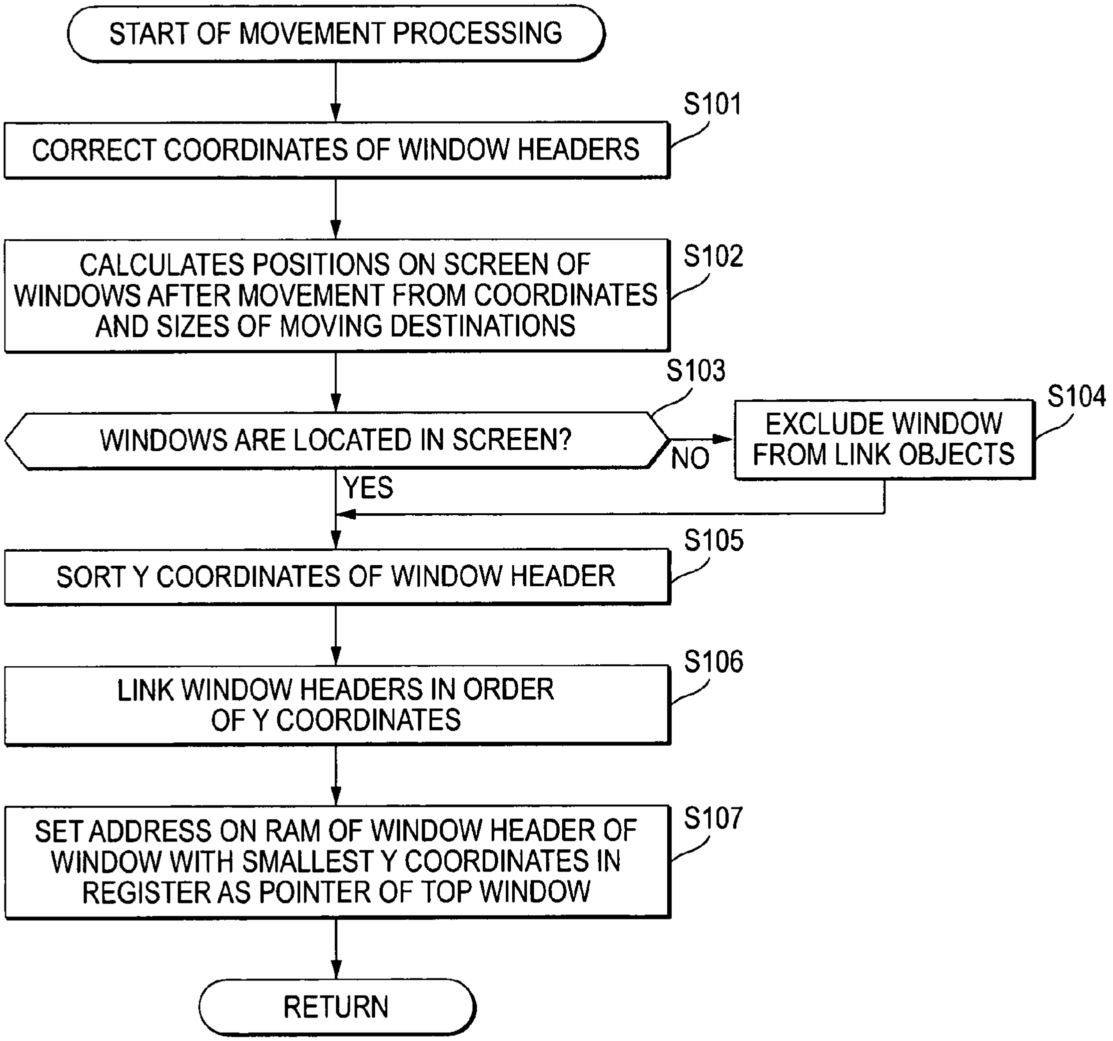
FIG. 13 is a flowchart for explaining details of movement processing.

Details of the movement processing are described in a flowchart in FIG. 13.

In step S101, the correcting section 111 corrects coordinates of window headers.

Figure 14:
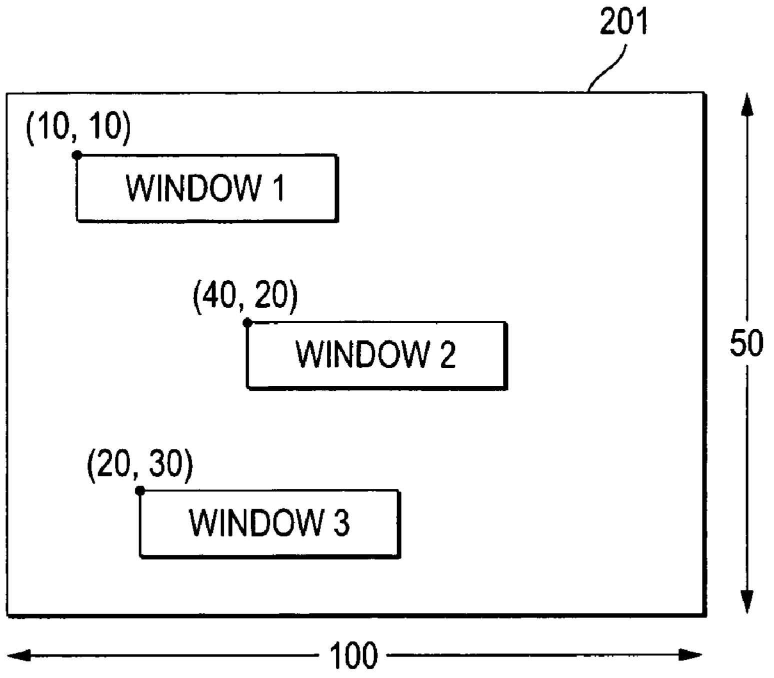
FIG. 14 is a diagram showing an example of display of windows.
Figure 15:
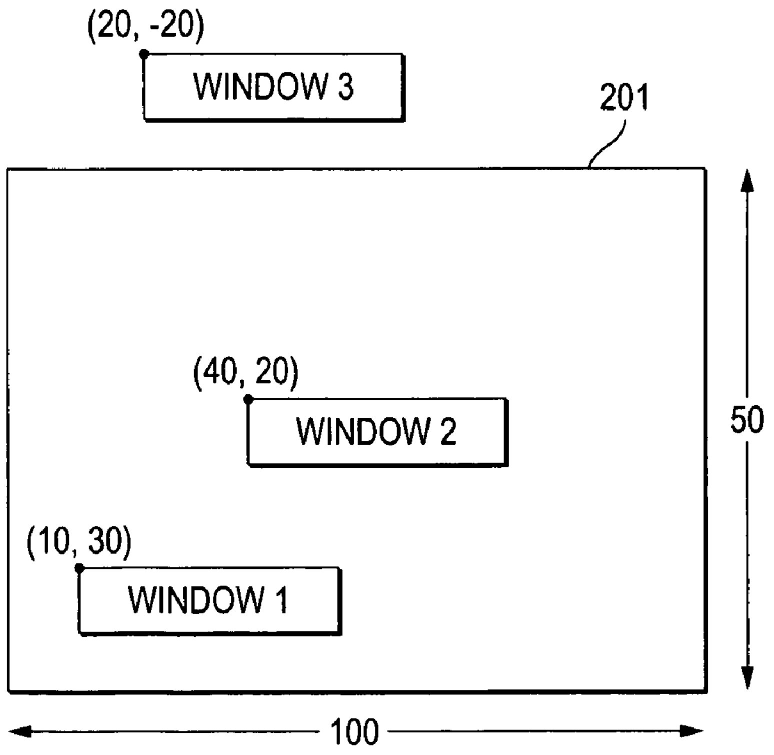
FIG. 15 is a diagram showing an example of display of windows.
Figure 16:
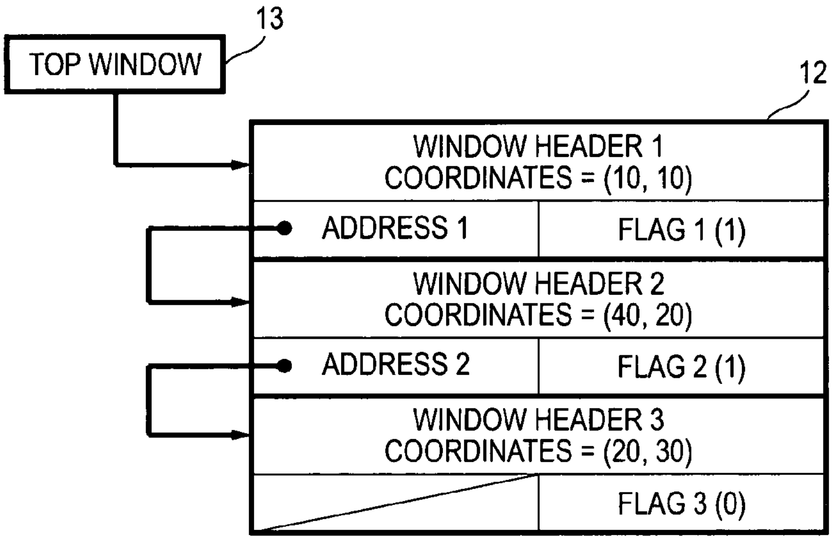
FIG. 16 is a diagram showing an example of display of a window header string.
Figure 17:
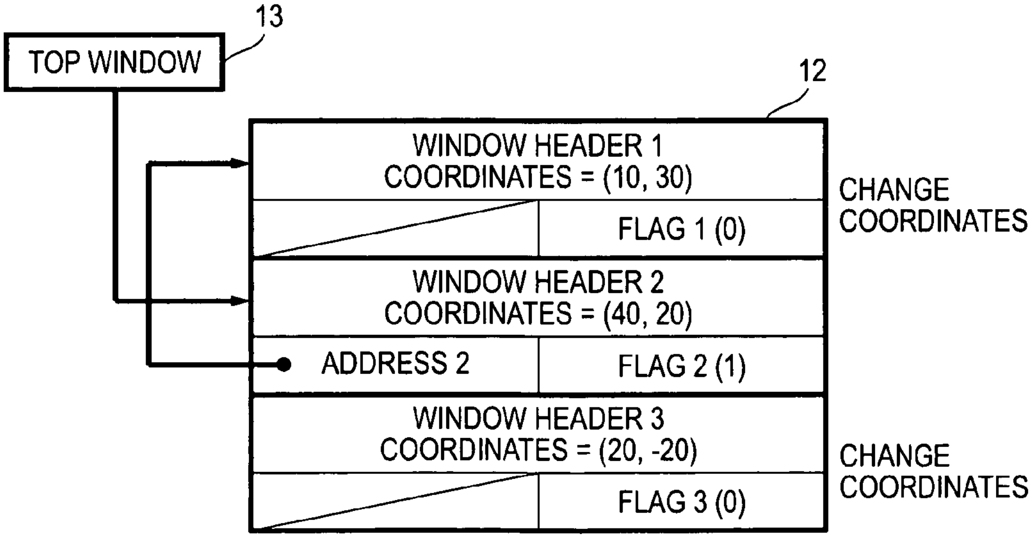
FIG. 17 is a diagram showing an example of display of a window header string.

For example, as shown in FIG. 14, in a state in which a window 1 in coordinates (10, 10), a window 2 in coordinates (40, 20), and a window 3 in coordinates (20, 30) are displayed, as shown in FIG. 15, the window 1 is moved to coordinates (10, 30) and the window 3 is moved to coordinates (20, −20). In this case, in association with the state shown in FIG. 14, a window header string is described as shown in FIG. 16. The window header string is changed as shown in FIG. 17. In other words, the coordinates of the window header 1 are changed from (10, 10) to (10, 30). The coordinates of the window header 3 is changed from (20, 30) to (20, −20).

In step S102, the calculating section 112 calculates positions on a screen of the windows after movement from coordinates and sizes of moving destinations. In step S103, the judging section 113 judges whether the windows after movement are located in the screen. Note that, in the judgment processing, when at least a part of a window is located in the screen, the judging section 113 judges that the window is located in the screen.

In the example shown in FIG. 15, although the window 1 is located in the screen 201, the window 3 is located outside an area of the screen 201. When it is judged in step S103 that the windows are located in the screen, in step S105, the sorting section 115 executes processing for sorting y coordinates of the window headers. On the other hand, when it is judged in step S103 that a window is not located in the screen, in step S104, the excluding section 114 executes processing for excluding the window from link objects. In the case of the example in FIG. 15, although the window 1 is located in the screen 201, the window 3 is located outside the screen 201. Thus, the window 3 is excluded from the link objects. Since it is unnecessary to sort the window excluded from the link objects, the window is also excluded from sort objects.

In the case of the example in FIG. 15, only the window 1 and the window 2 are set as the sort objects. As shown in FIG. 15, since coordinates of the window 2 is (40, 20) and coordinates of the window 1 is (10, 30), a y coordinate (20) of the window 2 is smaller than a y coordinate (30) of the window 1. Thus, as shown in FIG. 17, in step S106, the linking section 116 links the window headers in an order of the y coordinates. As shown in FIG. 17, coordinates on the RAM 12 of the window header 1 are described as the address 2 of the window header 2. "1" is described as the flag 2 of the window header 2. Nothing is described in an address (the address 1) of a window header next to the window header 1 because a window linked after the window header 1 is not present. "0" is described as the flag 1 of the window header 1. Since the window header 3 is excluded from the link objects, nothing is described in an address (the address 3) of the next window header. "0" is described as the flag 3 of the window flag 3.

In step S107, the setting section 117 sets an address on the RAM 12 of a window header of a window with a smallest y coordinate in the register 13 as a pointer of a top window. In other words, in the case of the example in FIG. 17, an address on the RAM 12 of the window header 2 is described in the register 13 as a pointer of a top window.

Referring back to FIG. 8, when it is judged in step S53 that the processing is not movement of coordinates of a window, in step S54, the judging section 71 judges whether the processing is a change in a size of a window. When the processing is a change in a size of a window, in step S59, the changing section 75 changes a size of a window header to a value designated by the application 31. As a result, the size of the window is changed to a designated value according to the processing of the image data generating unit 14.

When it is judged in step S54 that the processing is not a change in a size of a window, in step S55, the judging section 71 judges whether the processing is update of a state of a window. When the processing is update of a state of a window, in step S60, the updating section 76 executes processing for changing state parameters of a window designated by the application 31. Consequently, for example, an image displayed in the window is changed into a different state.

When it is judged in step S55 that the processing is not update of a state of a window, in step S61, the processing section 77 executes other processing.

According to the processing described above, a window header string is described in the RAM 12. An address on the RAM 12 of a window header at the top of the window header string, that is, a pointer is described in the register 13.

Figure 18:
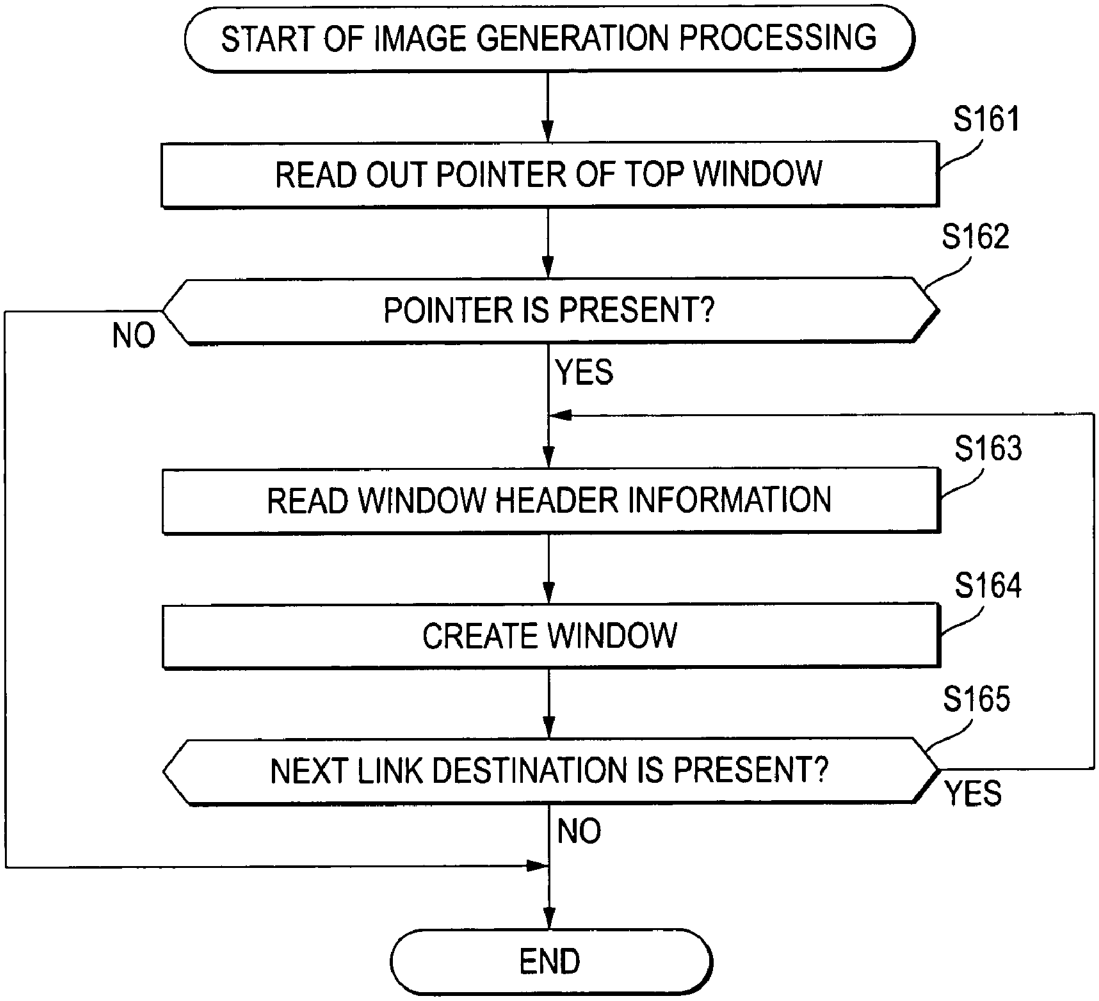
FIG. 18 is a flowchart for explaining image generation processing.

In such a state, the image data generating unit 14 executes the image generation processing described in the flowchart in FIG. 18.

In step S161, the readout section 151 executes processing for reading out the pointer of the top window. Specifically, the readout section 151 reads out the pointer, that is, the address on the RAM 12 of the window header in which information on the top window is described from the register 13. In step S162, the judging section 152 judges whether there is the pointer. When there is the pointer in the register 13, in step S163, the readout section 151 reads window header information from the RAM 12. In step S164, the creating section 153 creates a window. The window is created on the basis of the window header information read in step S163 and stored in the storing section 154 (the VRAM 15). For example, when a window header string is described as shown in FIG. 17, an address on the RAM 12 of the window header 2 is described in the register 13. Thus, window header information of the window header 2 is read out. The window 2 corresponding to the window header 2 is created and rendered on the storing section 154 (the VRAM 15). Image data rendered on the storing section 154 is read out and outputted to the display unit 16 to be displayed.

In step S165, the judging section 152 judges whether the next link destination is present. In the case of the example in FIG. 17, in the window header 2, the next link destination is described in the address 2. The address 2 designates the window header 1. The processing is returned to step S163.

The readout section 151 reads window header information of the window header 1. In step S164, the creating section 153 creates the window 1 on the basis of the information of the window header 1. Consequently, the window 1 is rendered on the storing section 154 (the VRAM 15). Image data of the window 1 is read out and outputted to the display unit 16 to be displayed. The processing is advanced to step S165 and it is judged whether the next link destination is present. The next link destination is not described after the window header 1. Therefore, the image generation processing is ended.

In this way, the window 1 and the window 2 shown in FIG. 15 are displayed on the screen 201 on the basis of the information described in the window header.

When it is judged in step S162 that the pointer is not present, the processing from steps S163 to S165 is skipped.

In the above explanation, the address on the RAM 12 of the window header at the top of the link is set in the register 13. However, the address may be set in a fixed address on the RAM 12 decided in advance.

As described above, windows are sorted on the basis of y coordinates on the VRAM 15 (the screen 201) of the windows and window headers are linked in accordance with an order of the windows sorted. Thus, it is possible to read information of the respective windows promptly and surely by sequentially reading out a link of the register 13 and the respective window headers. Even when windows are added or moved, only the link is changed and an entire window header string is not changed. Thus, it is possible to display the windows promptly and surely.

Since window headers are generated by middleware, it is unnecessary to generate window headers with an application. It is possible to generate the application promptly and at low cost.

It is possible to cause hardware to execute the series of processing or cause software to execute the series of processing. In this case, for example, it is possible to constitute the image display control apparatus with a personal computer 311 shown in FIG. 19.

Figure 19:
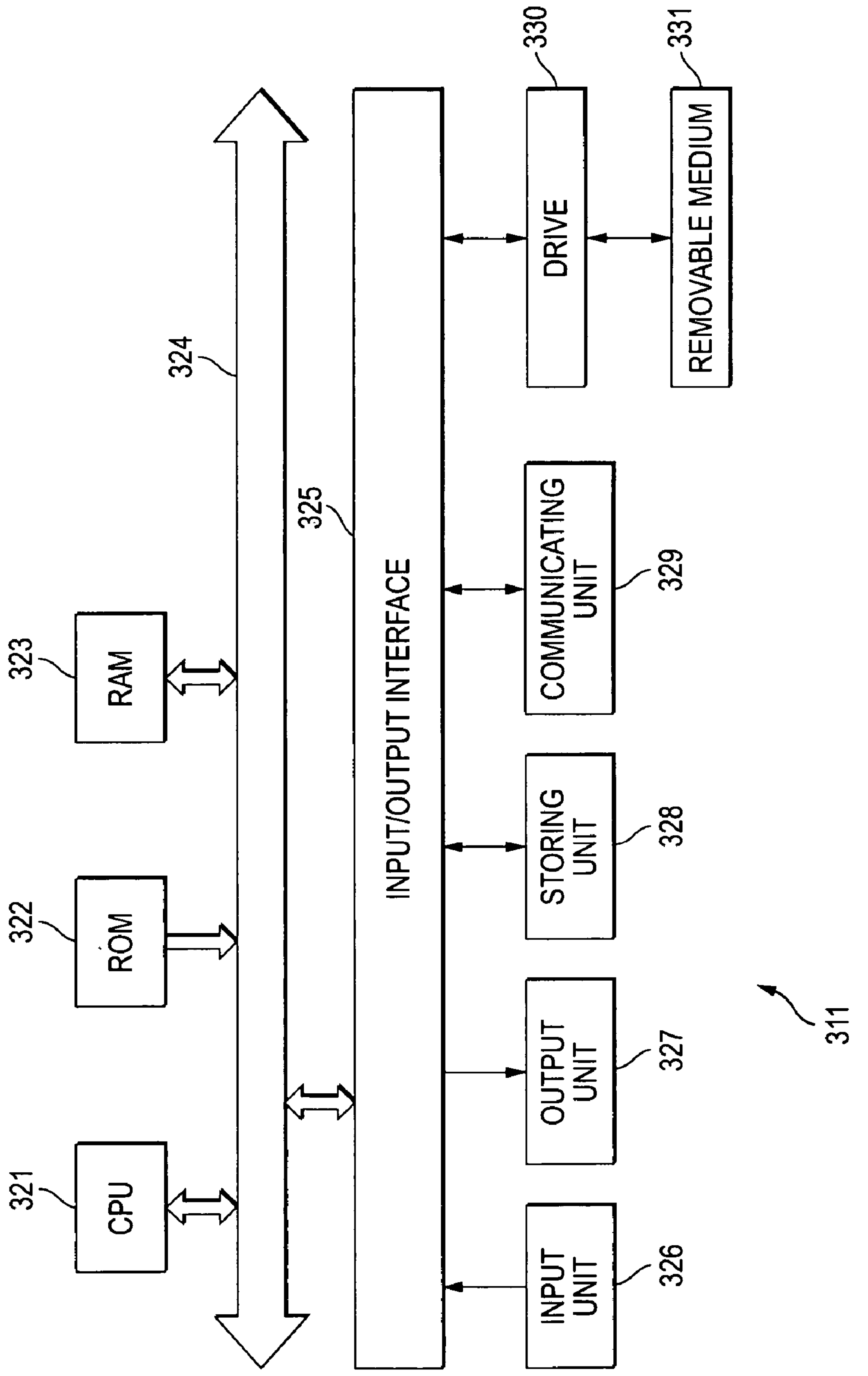
FIG. 19 is a block diagram showing an example of a constitution of a personal computer.

In FIG. 19, a Central Processing Unit (CPU) 321 executes various kinds of processing in accordance with programs stored in a Read Only Memory (ROM) 322 or programs loaded from a storing unit 328 to a Random Access Memory (RAM) 323. Data and the like necessary for the CPU 321 to execute the various kinds of processing are also stored in the RAM 323 according to circumstances.

The CPU 321, the ROM 322, and the RAM 323 are connected to one another via a bus 324. An input/output interface 325 is also connected to the bus 324.

An input unit 326 constituted by a keyboard, a mouse, or the like, a display constituted by a Cathode Ray Tube (CRT), a Liquid Crystal Display (LCD), or the like, an output unit 327 constituted by a speaker or the like, a storing unit 328 constituted by a hard disk or the like, and a communicating unit 329 constituted by a modem or the like are connected to the input/output interface 325. The communicating unit 329 performs communication processing via a network including the Internet.

A drive 330 is also connected to the input/output interface 325 when necessary. A removable medium 331 such as a magnetic disk, an optical disk, a magneto-optical disk, or a semiconductor memory is inserted into the driver 330 according to circumstances. A computer program read out from the removable medium 331 is installed in the storing unit 328 when necessary.

When the image display control apparatus causes software to execute the series of processing, a program constituting the software is installed, from a network or a recording medium, in a computer integrated in dedicated hardware or a personal computer or the like that is capable of executing various functions by installing various programs.

The recording medium is constituted not only by, separately from an apparatus body, the removable medium 331, which is distributed to provide a user with a program and in which a program is recorded, such as a magnetic disk (including a floppy disk), an optical disk (including a Compact Disk-Read Only Memory (CD-ROM) and a Digital Versatile Disk (DVD)), a magneto-optical disk (including a Mini-Disk (MD)), or a semiconductor memory but also by the ROM 322 having a program recorded therein, a hard disk included in the storing unit 328, or the like, which is integrated in the apparatus body in advance and provided to the user.

In this specification, a step describing a program recorded in a recording medium includes not only processing that is performed in time series according to a described order but also processing that is, although not always performed in time series, executed in parallel or individually.

It is possible to apply the invention to, for example, a DVD recorder.

It should be understood by those skilled in the art that various modifications, combinations, sub-combinations, and alterations may occur depending on design requirements and other factors insofar as they are within the scope of the appended claims or the equivalents thereof.

What is claimed is:

1. A computer storage medium embodied with a program for an image display control apparatus that controls display of windows on a screen on the basis of window headers, the program comprising the steps of:

upon receiving coordinates of the windows to be displayed on the screen,
- creating the window headers, in which the coordinates on the screen of the windows are described, and storing the window headers in a memory in a window header string;
- sorting y coordinates in coordinates of the windows described in the window headers;
- linking the window headers in an order of the sorted y coordinates; and
- setting a position in the memory of the window header with a smallest y coordinate at a top of the link upon receiving coordinates of window(s) to be erased,
- excluding the window header(s) corresponding to window(s) from being linked to the linked window headers for that screen, and
- changing only links, an entire window header string is not changed; and upon receiving coordinates of window(s) that are moved,
- correcting coordinates of window headers,
- calculate positions on the screen of window after movement from coordinates of moving destinations,
- determining if the windows are located in the screen based upon the calculated positions,
- if a window is located outside an area of the screen, excluding the windows header corresponding to that window from being linked to the linked window headers for that screen, and changing only links, the entire window header string is not changed,
- sorting y coordinates of the window header,
- linking the window header in the order of the sorted y coordinates, and
- setting a position in the memory of the window header with the smallest y coordinate at the top of the link.

2. The computer storage medium according to claim 1, wherein the program is middleware, and in the creating step, the window headers are created when an application program requests display of the windows.

3. The computer storage medium according to claim 1, wherein in the setting step, the position on the memory of the window header at the top of the link is set in a register.

4. The computer storage medium according to claim 1, wherein in the linking step, flags representing presence or absence of link destinations are described in the window headers.

5. An image display control method for an image display control apparatus that controls display of windows on a screen on the basis of window headers, the image display control method comprising the steps of:

upon receiving coordinates of the windows to be displayed on the screen, creating the window headers, in which the coordinates on the screen of the windows are described, and storing the window headers in a memory in a window header string;

sorting y coordinates in coordinates of the windows described in the window headers;

linking the window headers in an order of the sorted y coordinates, and setting a position in the memory of the window header with the smallest y coordinate at a top of the link, upon receiving coordinates of window(s) to be erased, excluding the window header(s) corresponding to window(s) from being linked to the linked window headers for that screen, and changing only links, an entire window header string is not changed; and upon receiving coordinates of window(s) that are moved, correcting coordinates of window headers, calculate positions on the screen of window(s) after movement from coordinates of moving destinations, determining if the windows are located in the screen based upon the calculated positions, if a window is located outside an area of the screen, excluding the windows header corresponding to that window from being linked to the linked window headers for that screen, and changing only links, the entire window header string is not changed, sorting y coordinates of the window header, linking the window header in the order of the sorted y coordinates, and setting a position in the memory of the window header with the smallest y coordinate at the top of the link.

6. An image display control apparatus that controls display of windows on a screen on the basis of window headers, the image display control apparatus comprising:

window header creating means, upon receiving coordinates of the windows to be displayed on the screen, for creating the window headers, in which coordinates on the screen of the windows are described, and storing the window headers in a memory in a window header string;

sorting means for sorting y coordinates in coordinates of the windows described in the window headers;

linking means for linking the window headers in an order of the sorted y coordinates, setting means for setting a position in the memory of the window header with a smallest y coordinate at a top of the link;

erasing means, upon receiving coordinates of window(s) to be erased, for excluding linking the window headers to the linked window headers for the screen, wherein only links are changed and an entire window header string is not changed; and moving means, upon receiving coordinates of window(s) that are moved, for correcting coordinates of the window (s), for calculating positions of the window(s) after movement, for excluding windows located outside the area of the screen from being linked to the linked window headers for that screen, wherein only links are changed, for sorting the y coordinates, for linking the window headers in the order of the sorted y coordinates and for setting a position in the memory of the window header with the smallest y coordinate at the top of the link.

7. An image display control apparatus that controls display of windows on a screen on the basis of window headers, the image display control apparatus comprising:

a window header creating section, upon receiving coordinates of the windows to be displayed on the screen, creating the window headers, in which coordinates on the screen of the windows are described, and storing the window headers in a memory in a window header string;

a sorting section sorting y coordinates in coordinates of the windows described in the window headers;

a linking section linking the window headers in an order of the sorted y coordinates, wherein if a window is located outside an area of the screen, the window header corresponding to that window is excluded from being linked to the linked window headers for that screen, and wherein only links are changed and an entire window header string is not changed;

a setting section setting a position in the memory of the window header with a smallest y coordinate at a top of the link;

erasing section, upon receiving coordinates of window(s) to be erased, excluding linking the window headers to the linked window headers for the screen, wherein only links are changed and an entire window header string is not changed; and moving section, upon receiving coordinates of window(s) that are moved, correcting coordinates of the window(s), calculating positions of the window(s) after movement, excluding windows located outside the area of the screen from being linked to the linked window headers for that screen, wherein only links are changed, sorting the y coordinates, linking the window headers in the order of the sorted y coordinates and setting a position in the memory of the window header with the smallest y coordinate at the top of the link.

* * * * *